July 17, 1928.

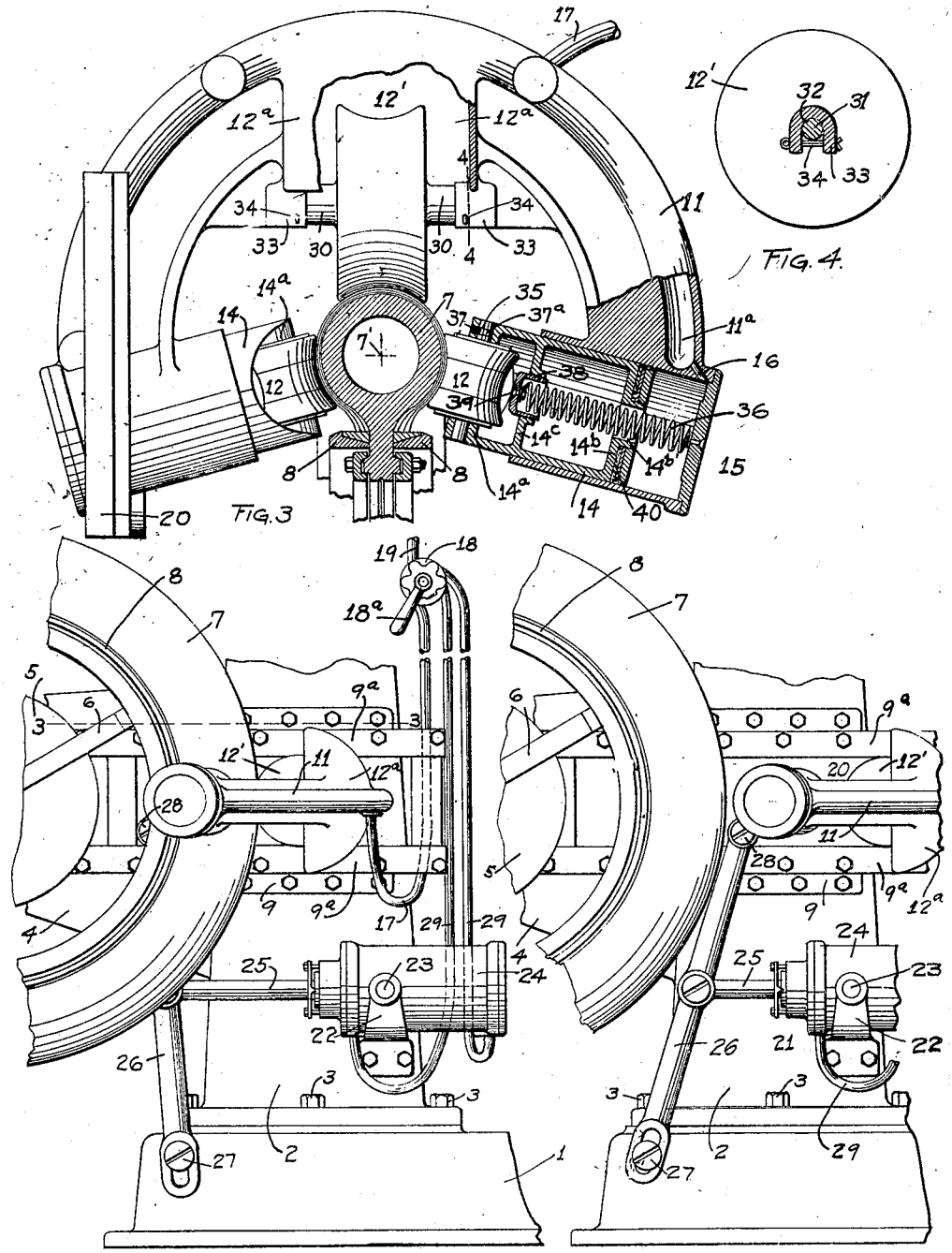

H. I. MORRIS

APPARATUS FOR MAKING TIRES OR TIRE CARCASSES

Filed Sept. 6, 1924     3 Sheets-Sheet 3

1,677,401

INVENTOR
Howard I. Morris
BY
ATTORNEY

Patented July 17, 1928.

1,677,401

UNITED STATES PATENT OFFICE.

HOWARD I. MORRIS, OF CLEVELAND, OHIO, ASSIGNOR TO THE CORD TIRE MACHINE COMPANY, OF CLEVELAND, OHIO, A CORPORATION OF ARIZONA.

APPARATUS FOR MAKING TIRES OR TIRE CARCASSES.

Application filed September 6, 1924. Serial No. 736,349.

This invention relates to an apparatus for making tire carcasses, more particularly to the rolling down mechanism partially disclosed in my co-pending application filed April 10, 1924, Serial No. 705,654, of which this application is in part a continuation.

One object of the invention is to provide an improved mechanism of relatively simple construction for rolling down the carcass forming material as it winds on the forming member.

Another object of the invention is to provide an improved rolling down mechanism capable of being readily controlled and operated to compress the material at a plurality of points transversely of the core.

Another object of the invention is to provide in a rolling down mechanism, improved means for positioning the material engaging devices irrespective of the size of the forming member in cross section.

Other objects of the invention will be apparent to those skilled in the art to which my invention relates from the following description taken in connection with the accompanying drawings, wherein.

Fig. 1 is a side elevation of a rolling down mechanism embodying my invention, such mechanism being shown associated with a core with which it co-acts to roll the material thereon.

Fig. 2 is a view similar to Fig. 1, but showing the mechanism in operative position.

Fig. 3 is a section on the line 3—3 of Fig. 2, with one of the cylinders and a portion of the wall of the supporting frame broken away.

Fig. 4 is a section on the line 4—4 of Fig. 3.

Figure 5:
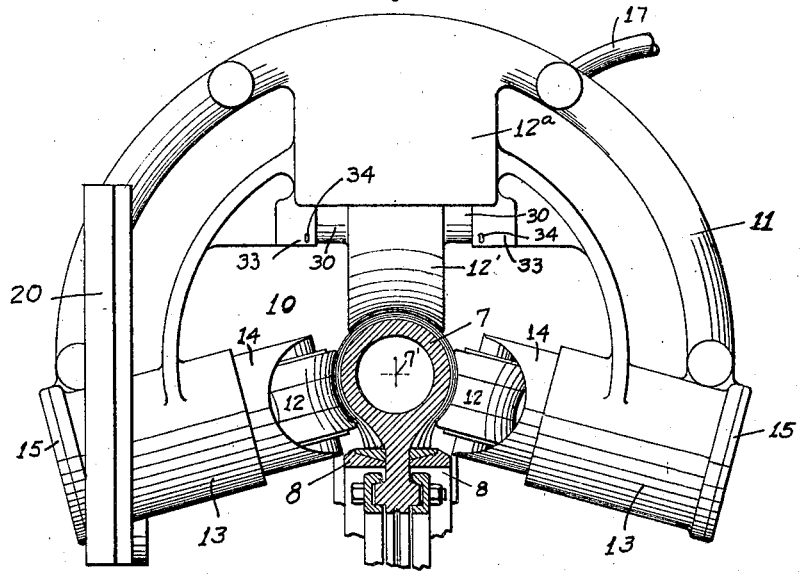
Fig. 5 is a sectional view on the line 3—3 of Fig. 2, but showing the mechanism adapted to a core of smaller size than the core shown in the latter figure.

My invention is particular adapted to rolling down carcass forming material as it is wound on a forming member. In practice it has been applied to the making of carcasses, wherein the material is delivered in the form of a web of indefinite length and wound convolutely on a core until the desired number of plies have been wound thereon and continuously rolled down as the winding takes place. In such practice, following the winding operation, the web was severed transversely, preferably along an inclined line, and then the core was rotated while maintaining the rolling down mechanism in operative position so as to completely roll the outer portion and the free outer end of the wound section into close engagement with the previously applied material.

The apparatus for fabricating the material and delivering it to the core and the mechanism for supporting, rotating and controlling the core is shown in my aforesaid application, for which reason it is only necessary to show herein a portion of such machine.

In the drawings, 1 indicates the base portion of the machine. 2 indicates a standard rising from the base 1, being secured thereto by cap screws 3. The standard has an extension 4, the walls of which support the core or chuck shaft (not shown) and house certain of the driving elements therefor. 5 indicates a suitable chuck fixed to the shaft and rotated thereby and provided with a plurality of movable arms 6 arranged to engage and removably support a core 7. The core 7 is shown as provided with bead rings 8 removably clamped to the opposite sides of the core.

9 indicates a guide fixed to the inner side or wall of the standard 2 and slidably supporting the rolling down mechanism, indicated as an entirety at 10. The guide 9 preferably comprises a pair of ways 9ª, 9ª, spaced equal distance from a line or plane extending radially of the axis of the chuck shaft.

Of the rolling down mechanism 10, 11 indicates a frame shaped to substantially enclose the core 7 transversely, being preferably arc shaped and extending around the core to points inwardly of a plane that is parallel to the chuck shaft and cuts the axis of the core body (indicated at 7') or outer surface transversely, the purpose being to support a plurality of material engaging or rolling down devices 12 disposed transversely of the core, preferably in a common transverse plane and at a plurality of positions, so that the material may be compressed along the opposite sides of the core and preferably along the inner or under cut portions thereof. The engaging devices 12 are movable preferably in radial directions toward such axis and operate to uniformly compress the material and roll it transversely in to the exact shape and size of the core as the successive convolutions are applied. The frame 11 comprises a casting having a thickened outer section in which is formed a conduit 11ª for compressed air or other medium and enlarged hollow heads at its opposite ends forming the side walls of cylinders 13 having pistons 14 to which reference will later be made.

15 indicates caps for the outer ends of the cylinder walls, the caps being secured in position in any desired manner. 16 indicates ducts or ports formed in the casting wall to conduct the compressed air from the conduit 11ª to points behind the pistons 14.

The conduit 11ª is connected in a suitable manner by an inlet with a pipe 17, the pipe leading to a valve mechanism 18, and the latter being connected by a pipe 19 with a source of supply.

The frame 11 is provided with a shoe 20 of suitable construction, which slidably engages the ways 9ª.

21 indicates as an entirety means for moving the frame 11 into operative position and maintaining it therein and for moving it away from the core or into its inoperative position. Of these means, 22 indicates a bracket preferably supported upon the inner side wall of the standard 2, said bracket and side wall being provided with suitable bearings for trunnions 23 to movably support a cylinder 24. The piston for the cylinder 24 is connected to and operates a rod 25, pivotally connected at its outer end to a lever 26. The lower end of the lever 26, pivotally and slidably engages a stud shaft 27 on the side wall of the base 1, the shaft preferably comprising a headed pin the inner end of which is screw threaded and fits a threaded opening in such side wall. The upper end of the lever 26 is pivotally connected to the shoe 20 preferably by a shaft 28 similar in construction to the shaft 27. The opposite ends of the cylinder 24 are formed with suitable ports to each of which is connected a pipe 29, to admit air to either side of the piston and to permit the escape of air from the other side; the valve mechanism 18 being constructed to permit of such supply and exhaust dependent upon the position of the control handle 18ª. By operation of the handle 18ª, the frame 11 may be moved from the position shown in Fig. 1 to the position shown in Fig. 2, where it is maintained until the control handle 18ª is moved to reverse the air supply and exhaust to return the frame 11 to the Fig. 1 position.

12' indicates a positioning and aligning device carried by the frame 11 and preferably mounted thereon to engage the material on the core 7 as it winds thereon at a point midway between the rolling down devices 12. The positioning device 12' preferably comprises a concave roller having hubs 30 through which a shaft 31 extends, the opposite ends of the shaft fitting into recesses 32 formed in a pair of spaced lugs 33 formed integrally with and projecting inwardly from the frame 11. The recesses open on the inner sides of the lugs to permit the positioning and removal of the shaft 31, cotter pins 34 being preferably provided and fitting aligned openings in the wall of the lugs 33 to removably hold the shaft in the recesses 32. The hubs 30 preferably extend laterally far enough to abut the inner faces or edges of the lugs 33 so as to prevent endwise movement of the positioning device 12'. 12ª indicates a casing formed integrally with the frame 11 and extending around the device 12'.

As shown in Fig. 3, the diameter of the positioning and aligning roller 12' has a fixed relation to the diameter of the core 7 and the diameter of its body portion, so that upon its engagement with the core or the material thereon, incident to the movement of the frame 11 into operative position, the roller 12' will position the rolling down devices 12 on lines radially of the axis 7' of the core body portion.

I preferably provide two material engaging devices 12 disposed at equal distances from the opposite sides of the roller 12', these being rotatably mounted on the outer ends of the pistons 14 and movable therewith toward and from the core 7. Each of the devices 12 comprises a roller removably supported in suitable bearings in the following manner: The outer side walls of each piston 14 are formed with opposed hollow bosses 14ª in which fit the ends of a shaft 35. The shaft 35 loosely supports a roller 12 the face of which is preferably concave to correspond to the cross sectional shape of the core 7. One of the bosses 14ª is formed with a screw threaded opening to receive a screw 37, the inner end of which projects into an annular groove 37ª formed in the shaft 35. If a different sized core is to be used, the screw 37 is loosened, then the shaft 35 is removed and then the roller, to permit replacement by a roller 12 having a concave shape to correspond to the size of core that is to be used. The rollers 12 may be of sectional character to avoid undue friction while engaging with the material to roll it down.

Each of the pistons 14 may comprise a tubular member having a head 14$^b$ and a transverse web 14$^c$ at or near its outer end. Each piston 14 is projected outwardly by compressed air, admitted through the port 16. It is moved inwardly by a spring 36 connected at its outer end to the adjacent cap 15 and at its inner end to the piston 14, being put under tension by the movement of the piston outwardly. The piston head 14$^b$ is preferably formed with an opening 14$^{b'}$ through which the spring 36 extends so that it may be connected to the web 14$^c$, this arrangement permitting the provision of a screw threaded opening 38 in the web 14$^c$ to receive a screw threaded plug 39 to which the inner end of the spring is connected. By rotating the plug 39 it will serve to adjust the tension of the spring 36 to insure its positive movement and control. Since the web 14$^c$ forms a closed wall transversely of the piston, the air passing through the opening 14$^{b'}$ will act thereon to force the piston outwardly. If desired, the head 14$^b$ may be provided with a collar around the opening 14$^{b'}$ and such collar may have removably secured to it an annular plate which engages a packing 40 to prevent leakage around the side walls of the piston 14.

It will be noted that the engaging devices 12 are supported to move in a direction that is radial of the axis 7' of the body portion of the core 7 and that they are yieldingly held in operative position by the action of the air on the pistons 14.

In operating the mechanism, the handle 18$^a$ is operated to one position to move the frame 11 into operative relation to the core and then the handle is moved to a second position to admit air to the conduct 11$^a$ to operate the devices 12.

Where a core having a body portion of less diameter than that of the core shown in Fig. 3 is to be used, I substitute a positioning and aligning device 12' the diameter of which is increased an amount corresponding to the decrease in diameter of the body portion of the core, as shown in Fig. 5, so that the distance from the axis 7' of the core body portion to the axis of the positioning device is substantially the same; the result being that the position and direction of movement of the engaging devices 12 relative to such axis remain unchanged and no adjustment of the cylinders 13 or frame 11 is required. Likewise, when the core body portion has a larger diameter, I substitute a device 12' the diameter of which is decreased an amount corresponding to the increase in diameter of the core body portion.

When such changes are effected, I prefer to change the rolling down devices 12 and substitute devices the concave surfaces of which correspond to the shape of the core body portion which is to be used.

In my construction I provide a relatively simple form of mechanism which may be readily adapted to various sized cores. The construction is such that relatively great pressure may be yieldingly applied to the material as winding thereof takes place, thus insuring uniform rolling, a smooth outer surface on the carcass devoid of humps or buckles, an intimate and permanent association of one convolution of the material with the next inner one, and predetermined sized carcasses with the cords and other materials uniformly tensioned.

Figure 7:
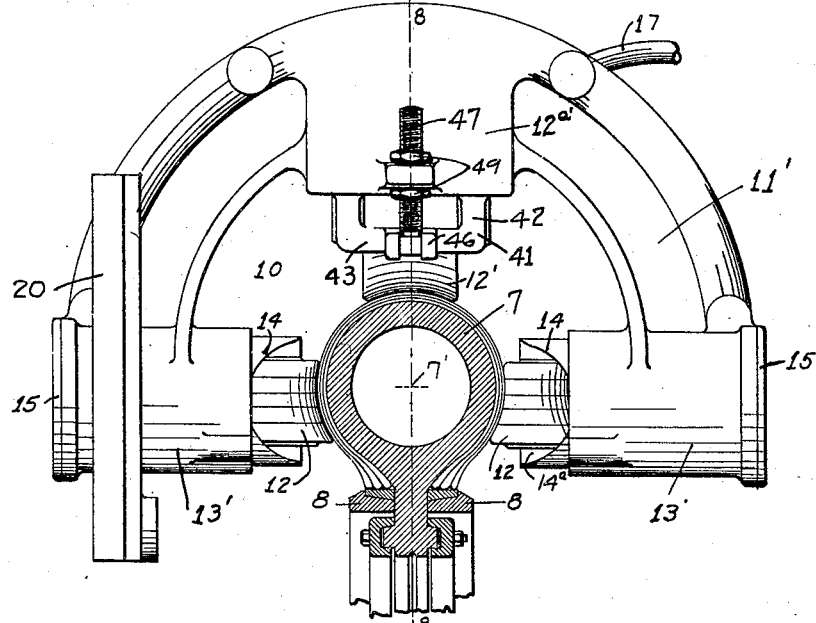
Fig. 7 is a view substantially similar to Figs. 3, 5 and 6 but showing a modified form of construction.
Figures 8, 9:
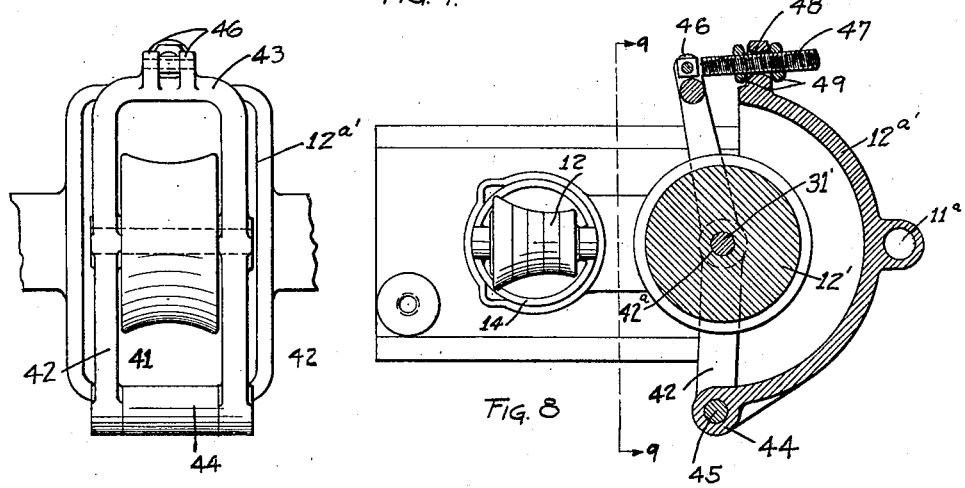
Fig. 8 is a section on the line 8—8 of Fig. 7.
Fig. 9 is a fragmentary elevation on the line 9—9 of Fig. 8 looking in the directions of the arrows.

In Figs. 7, 8 and 9 I have shown a modified form of construction in which the positioning and aligning roller is adjustably supported in its frame, whereby the rolling down devices may be moved in a direction substantially radially of the core to insure their proper position or to avoid the necessity of changing the roller 12' where a different sized core is to be used. In this form of construction I have also shown the rolling down devices as mounted for movement at right angles to the plane of the core.

Figure 6:
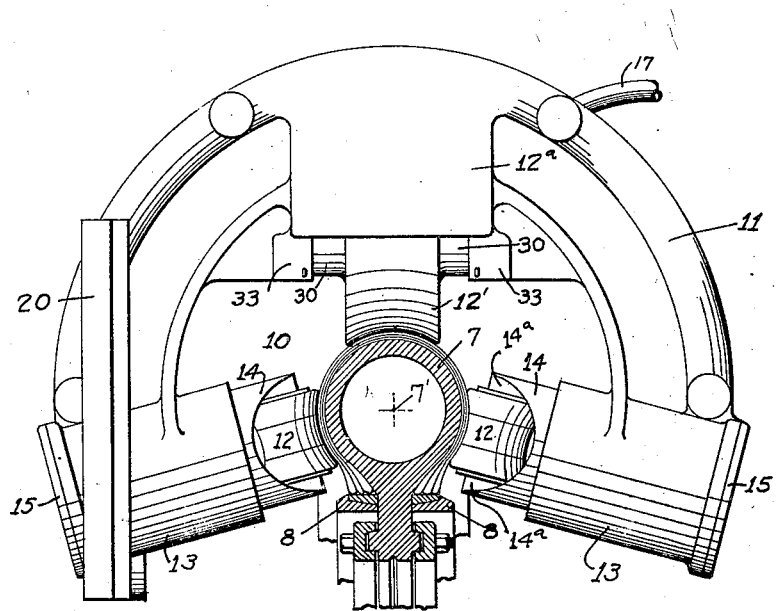
Fig. 6 is a sectional view on the line 3—3 of Fig. 2, but showing the mechanism adapted to a larger sized core than the core shown in the latter figure.

In these views 11' indicates a frame having cylinders 13' at its opposite ends disposed in line with each other and at right angles to the plane of the core 7, the piston for each cylinder carrying at its outer end a sectional roller, which may have a concave face corresponding to the shape of the rollers shown in Figs. 3, 5 and 6, or shaped as shown in Fig. 7 so as to bear against the under-cut portions of the material.

41 indicates a cradle, preferably of U-shape, having side members 42 and an end member 43. The free ends of the side members are formed with openings which register with a knuckle 44 formed on lower end or edge of the casing 12$^{a'}$ to receive a shaft or pivot pin 45, to permit the cradle 41 to swing outwardly and inwardly. The end member 43 is provided with a pair of lugs 46, between which is pivoted a threaded rod 47, the free end of which extends through an opening 48 formed in a lug projecting laterally from the adjacent end of the casing 12$^{a'}$. A pair of nuts 49 are mounted on the rod 47 and tightened against the opposite faces of the lug to hold the cradle 41 in its adjusted position. The positioning roller 12' is carried by a shaft 31' supported at its opposite ends in openings 42$^a$ formed in the side members 42, being removably held in such openings by a set screw or equivalent means.

In this latter form of construction I provide means for bodily adjusting the roller 12' to effect engagement of the rollers 12 at any desired point or points or upon any desired area along the sides of the core. By such adjustment (1) the rolling down devices may be accurately positioned to act upon the material inwardly at the desired points due to variations in the size of the cores or thickness of the material and (2) the roller can be moved to position the rolling down devices in operative relation to cores of different sizes without the necessity of removing it and substituting another roller of larger or smaller diameter.

To those skilled in the art to which my invention relates many changes in construction and widely differing embodiments and applications thereof will suggest themselves without departing from the spirit and scope thereof. My disclosures and the description herein are purely illustrative and are not intended to be in any sense limiting.

What I claim is:

1. In apparatus of the class described, the combination with a rotatable former on which the material is wound, of a frame supported so as to be movable toward and from the former, a positioning device carried by the frame arranged to engage with the material upon the former, rolling down means supported directly in the frame and located on either side of the positioning device, automatically operating means arranged to move the rolling down means to positions out of contact with the material on the former when the positioning device comes into engagement with the material supported on the former, and means under the control of the operator to force the rolling down means into engagement with the material after the frame has been advanced to bring the positioning device into contact with the material.

2. In apparatus of the class described, the combination with a rotatable forming member on which material is wound, of a frame, a rolling down device movably supported on said frame, a member to position said device in engagement with the material wound on said forming member supported in the frame so as to be easily removable therefrom, permitting substitution of different positioning members as circumstances may require, and means for moving said frame to engage said positioning member with said forming member.

3. In apparatus of the class described, the combination with a rotatable former on which material is wound, of a frame, a pair of rollers spaced apart and arranged to roll down the material on the former mounted in the frame, another roller supported directly in the frame and arranged between the rolling down rollers operating to position the frame and also to roll down the material, so that all the said rollers come to position to properly act on the material on the former when the frame is advanced, the rollers being disposed to partially encircle the former and cause the rollers to operate upon the material in the same transverse planes, and means for moving the frame to effect engagement of the positioning member with the material on the former.

4. In apparatus of the class described, the combination with a rotatable forming member on which material is wound, of a frame, a pair of spaced rolling down devices mounted on said frame and movable therein on lines radial to the axis of the forming member in the planes in which the rolling down devices operate, a member removably mounted on said frame intermediate said devices and arranged to position them in engagement with the material wound on said forming member, and means for moving said frame to effect engagement of said positioning member with said forming member.

5. In apparatus of the class described, the combination with a rotatable forming member on which material is wound, of a frame, a pair of rolling down devices mounted on said frame in spaced relation to engage the sides of said forming member or the material thereon, a member mounted on said frame intermediate said devices and arranged to engage the crown or outer surface of said forming member or the material thereon to position said devices in their operating position, the said rolling down and positioning devices being disposed so as to act upon the material on the forming member in the same transverse plane, and means for moving said frame to effect engagement of said positioning member with said forming member.

6. In apparatus of the class described, the combination with a rotatable forming member on which material is wound, of a frame, a pair of rolling down rollers mounted on said frame in spaced relation to engage the sides of said forming member or the material thereon, a roller mounted on said frame intermediate said rolling down rollers, and removably supported so that it may be easily replaced by another roller, and arranged to engage the outer surface of said forming member or the material thereon to position said rollers in their operating positions, the said rollers all acting on the material on the forming member in the same transverse plane, and means for moving said frame to effect engagement of said positioning member with said forming member.

7. In apparatus of the class described, the combination with a rotatable forming member on which material is wound, of a frame movable toward and from the forming member on lines radial thereto, the frame being arc shaped so that when moved forward it extends partially around the forming member, a pair of rolling down rollers removably mounted in spaced relation to each other in the forward end portions of said frame to engage the sides of said forming member or the material thereon, a member mounted in the central portion of said frame intermediate said devices and arranged to engage the outer surface of said forming member or the material thereon to position said devices in their operating position, means for moving said frame to effect engagement of said positioning member with said forming member.

8. In apparatus of the class described, the combination with a rotatable forming member on which material is wound, of a frame, rolling down devices supported on said frame in spaced relation, a member mounted on said frame intermediate said devices for positioning them in engagement with the material wound on said forming member, the said rolling down devices and the positioning member being supported so as to be easily removable to permit ready replacement of said parts to suit the size of the forming member with which they co-operate and means for moving said frame to engage said positioning member with said forming member.

9. In apparatus of the class described, the combination with a rotatable forming member on which material is wound, of a frame, a pair of spaced rolling down devices movably mounted on said frame, a member mounted on said frame intermediate said devices and arranged to position them in engagement with the material wound on said forming member, means for moving said frame to effect engagement of said positioning member with said forming member, and means for adjusting said positioning member on said frame.

10. In apparatus of the class described, the combination with a rotatable forming member on which material is wound, of a frame, a pair of rolling down devices mounted on said frame in spaced relation to engage the sides of said forming member or the material thereon, a member arranged to engage the outer surface of said forming member or the material thereon to position said devices in their operating position, a cradle movably mounted on said frame intermediate said devices for supporting said positioning member, means for adjusting said cradle on said frame, and means for moving said frame to effect engagement of said positioning member with said forming member.

11. In apparatus of the class described, the combination with a rotatable forming member on which material is wound, of a frame, a pair of rollers mounted in spaced relation on said frame to engage the sides of said forming member or the material thereon to roll down the latter, a roller arranged to engage the outer surface of said forming member or the material thereon to position said rollers in their operating position, a cradle pivotally mounted at one end on said frame and supporting said positioning roller intermediate said rolling down rollers, means for adjustably connecting the opposite end of the cradle to said frame, and means for moving said frame to effect engagement of said positioning roller with said forming member.

In testimony whereof, I have hereunto subscribed my name.

HOWARD I. MORRIS.